US009989554B2

United States Patent
Grundmann

(10) Patent No.: US 9,989,554 B2
(45) Date of Patent: Jun. 5, 2018

(54) ACCELERATION SENSOR, ESPECIALLY DUPLEX ACCELERATION SENSOR, ARRANGEMENT AND METHOD FOR DETECTING A LOSS OF ADHESION OF A VEHICLE TIRE

(71) Applicant: Bert Grundmann, Ganderkesee (DE)

(72) Inventor: Bert Grundmann, Ganderkesee (DE)

(73) Assignee: Bert Grundmann, Ganderkesee (DE)

( * ) Notice: Subject to any disclaimer, the term of this patent is extended or adjusted under 35 U.S.C. 154(b) by 147 days.

(21) Appl. No.: 14/916,147

(22) PCT Filed: Aug. 18, 2014

(86) PCT No.: PCT/EP2014/067585
§ 371 (c)(1),
(2) Date: Mar. 2, 2016

(87) PCT Pub. No.: WO2015/032613
PCT Pub. Date: Mar. 12, 2015

(65) Prior Publication Data
US 2016/0195568 A1    Jul. 7, 2016

(30) Foreign Application Priority Data
Sep. 3, 2013   (DE) .................. 10 2013 217 478

(51) Int. Cl.
*G01P 3/00* (2006.01)
*G01P 15/105* (2006.01)
(Continued)

(52) U.S. Cl.
CPC ............ *G01P 15/105* (2013.01); *B60T 8/172* (2013.01); *B60T 8/1725* (2013.01); *B60T 8/1761* (2013.01);
(Continued)

(58) Field of Classification Search
CPC ............ G01P 15/02; G01P 2015/0805; G01P 15/0888; G01P 15/0891; G01P 15/105;
(Continued)

(56) References Cited

U.S. PATENT DOCUMENTS

| 3,744,850 A | 7/1973 | Barthlome |
| 3,846,748 A | 11/1974 | Hopwood |

(Continued)

FOREIGN PATENT DOCUMENTS

| DE | 821562 C | 11/1951 |
| DE | 2600145 A1 | 9/1976 |

(Continued)

OTHER PUBLICATIONS

International Search Report dated Oct. 3, 2015 in Int'l Patent Application No. PCT/EP2014/067585, 10 pages.
(Continued)

*Primary Examiner* — Benjamin Schmitt
(74) *Attorney, Agent, or Firm* — Kilpatrick Townsend & Stockton, LLP

(57) ABSTRACT

The invention relates to an acceleration sensor, especially a duplex acceleration sensor, an arrangement and a method for detecting a loss of road grip of a vehicle wheel (3). The acceleration sensor comprises a tube (5) having a longitudinal axis forming a circular arc segment, and two closed ends. A mass (15; 315) is arranged inside the tube (5) such that is able to move inside the tube (5) in the longitudinal direction thereof. A magnet arrangement (17; 203; 205; 317) is designed to counteract, by way of a magnetic force exerted on the mass (15; 315), a movement of said mass (15; 315) from an idle position (25), and a read-out unit (608) is designed to detect a movement of said mass (15) from the idle position (25).

13 Claims, 6 Drawing Sheets

(51) Int. Cl.
*B60T 8/172* (2006.01)
*B60T 8/1761* (2006.01)
*G01P 15/08* (2006.01)
*G01P 15/135* (2006.01)

(52) U.S. Cl.
CPC ........ *G01P 15/0891* (2013.01); *G01P 15/135* (2013.01); *B60T 2210/12* (2013.01); *B60T 2210/13* (2013.01); *B60T 2240/03* (2013.01); *G01P 2015/0805* (2013.01)

(58) Field of Classification Search
CPC ........ B60T 8/171; B60T 8/172; B60T 8/1725; B60T 8/175; B60T 8/1755; B60T 8/176; B60T 8/1761; B60T 2210/13; B60T 2240/03
USPC .............. 73/514.01, 514.16, 514.31, 514.39; 180/170, 171, 172, 197, 282
See application file for complete search history.

(56) References Cited

U.S. PATENT DOCUMENTS

| | | | |
|---|---|---|---|
| 3,946,173 | A | 3/1976 | Haber |
| 4,571,844 | A | 2/1986 | Komasaku et al. |
| 8,565,995 | B2 | 10/2013 | Kueperkoch et al. |
| 2001/0029420 | A1 | 10/2001 | Kawasaki et al. |
| 2005/0033499 | A1 | 2/2005 | Ekmark et al. |
| 2009/0071249 | A1* | 3/2009 | Kitazaki ................ B60C 19/00 73/514.33 |
| 2011/0082663 | A1 | 4/2011 | Geisler et al. |
| 2014/0123756 | A1* | 5/2014 | Consoli ............... G01P 15/0802 73/514.36 |

FOREIGN PATENT DOCUMENTS

| | | |
|---|---|---|
| DE | 2644606 A1 | 4/1978 |
| DE | 3206694 A1 | 9/1983 |
| DE | 3506758 A1 | 8/1986 |
| DE | 19602428 A1 | 7/1996 |
| DE | 19813941 A1 | 10/1999 |
| DE | 19930779 A1 | 1/2001 |
| DE | 10223214 A1 | 12/2003 |
| DE | 102004051654 A1 | 4/2006 |
| DE | 102005036531 A1 | 8/2006 |
| DE | 102007014765 A1 | 10/2008 |
| DE | 102007052749 A1 | 5/2009 |
| DE | 102009021567 A1 | 12/2009 |
| DE | 112011100969 T5 | 4/2013 |
| EP | 0317962 A2 | 5/1989 |
| EP | 0517082 A2 | 12/1992 |
| EP | 2581258 A1 | 4/2013 |
| JP | S48108338 U | 12/1973 |
| JP | H06-010871 U | 2/1994 |
| JP | H09280941 A | 10/1997 |
| JP | H10160460 A | 6/1998 |
| JP | 2001-155601 A | 6/2001 |
| JP | 2006072588 A | 3/2006 |
| WO | 2005/06993 A2 | 8/2005 |

OTHER PUBLICATIONS

Search Report by Registered Searching Organization for Japanese Application No. 2016-539460 dated Feb. 7, 2018, 15 pages (Machine Translation).

Decision to Grant for Japanese Application No. 2016-539460 dated Feb. 27, 2018, 6 pages.

* cited by examiner

ACCELERATION SENSOR, ESPECIALLY DUPLEX ACCELERATION SENSOR, ARRANGEMENT AND METHOD FOR DETECTING A LOSS OF ADHESION OF A VEHICLE TIRE

CROSS-REFERENCE TO RELATED APPLICATIONS

This application is a National Stage of International Application No. PCT/EP2014/067585, International Filing Date Aug. 18, 2014, which claims the benefit of priority of German Application No. 102013217478.0, filed Sep. 3, 2013, the disclosures of which are herein incorporated by reference.

BACKGROUND OF THE INVENTION

The invention relates to a, in particular direct, acceleration sensor, an arrangement and a method for detecting a, in particular longitudinal, loss of road grip of a vehicle wheel.

In the context of the present invention, the term vehicle wheel means a rim with a tire, wherein the tire makes contact with the road surface on which the vehicle is moving. In this context, vehicle relates, in particular, to a passenger car. The term "loss of road grip (adhesion)" means that the tire slides or, at least, partially spins. This means that, in case of ideal road grip, the rotational speed of the tire corresponds to the speed of the vehicle on the road surface (*for motor sports purposes, the ideal road grip is at 10-20% slip). A loss of road grip (short term or for a longer period of time) leads to a difference between the rotational speed of the tire and the speed of the vehicle on the road surface.

Indirect acceleration sensors, arithmetic circuits, arrangements and methods for an approximate detection are generally known from prior art. A device (positioned at the dashboard) for monitoring the centrifugal force on the entire vehicle, which occurs when driving through curves, is known from DE 821 562. In this context, neither an acceleration in the driving direction nor the behavior of the individual wheels is determined.

Thus, in particular indirect, acceleration sensors are known for example from DE 198 13 941 A1, DE 199 30 779 A1, US 2009/0071249 A1, DE 10 2009 021 567 A1. Methods for evaluating acceleration sensors arranged at or in a vehicle wheel are known from EP 0 517 082 A2, US 2011/0082663 A1, WO 2005 069 993 A2, DE 102 23 214 A1, DE 11 2011 100 969 T5, DE 10 2007 014 765 A1. US 2009/0071249 A1 describes, in particular, an acceleration sensor arranged inside a tire of a vehicle. In addition, it is described that an acceleration sensor is used to detect a vibration of the tire in the circumferential direction, and that another acceleration sensor is used to detect a vibration in the tire width direction so that a road surface friction coefficient can be determined.

Furthermore, an arithmetic circuit for monitoring the slip at the wheels of vehicles is known from DE 32 06 694 A1. To this end, the respective rotations of the wheel are counted at each wheel and (if there is a respective difference) the acceleration of the wheel is calculated from two subsequent signals. DE 10 2007 052 749 A1 discloses a method for calculation the wheel slip. In this context, the drive torque applied to at least one wheel is changed and the reaction of the wheel (speed) to this change is measured and evaluated. A method for estimating the adhesive friction between the wheel and the road is known from US2005/0033499 A1. Said method includes applying a positive torque on a first axle and a negative torque on the rear axle, through which, amongst others, the adhesive friction coefficient is determined. U.S. Pat. No. 3,744,850 discloses a control system for the wheel traction which automatically determines the wheel slip with the maximum traction and maintains the latter by controlling braking and accelerating. To this end, the quotient of the linear acceleration and the angular acceleration is determined.

Against this background, it is the object of the invention to create an improved, in particular direct, acceleration sensor, an arrangement and a method for detecting a loss of road grip of a vehicle wheel, in particular, for detecting a loss of road grip before the vehicle, in particular the entire vehicle, loses a stable driving behavior.

SUMMARY OF THE INVENTION

According to the invention, this object is achieved by means of an acceleration sensor of the type mentioned above, comprising a tube having a longitudinal axis forming a circular arc segment, and two closed ends, a mass arranged inside the tube such that it is able to move inside said tube in the longitudinal direction thereof, a magnet arrangement designed to counteract, by way of a magnetic force exerted on the mass, a movement of said mass from an idle position, and a read-out designed to detect a movement of said mass from said idle position, wherein the tube is preferably arranged at the vehicle wheel in such a way that a movement of the mass from the idle positon will occur if the acceleration of the vehicle wheel (in the rotational direction of the vehicle wheel) changes.

This invention is based on the insight that known collision avoidance and driving dynamics control systems, such as ESC (Electronic Stability Control; often also referred to as ESP), only intervene at a late point in time, namely once the entire vehicle has already mostly left a stable driving situation. In addition, this intervention is executed entirely by the vehicle. In this approach, the collision avoidance potential of a vehicle driver, i.e. its willingness to share the responsibility—the existence of which can be generally assumed—, is not utilized in the pre-phase. This fact is particularly noticeable in the case of mass collisions due to heavy rainfall, snowfall and/or ice, but also in the case of individual accidents due to low tire tread or unsuitable tire specifications (summer tires in the winter) or due to a loss of contact pressure due to a lack of aero dynamics in case of high speed. Each of the above described driving scenarios results in a significant loss of road grip of the vehicle wheels, the extent of which the vehicle driver is not aware of until the accident occurs. If the vehicle driver was informed of the starting loss of road grip, of which there are usually signs, the vehicle driver could react immediately and contribute him-/herself to the avoidance of the accident.

Furthermore, the invention has realized that a significant loss of road grip due to aquaplaning, snow and ice as well as due to a lack of contact pressure does not occur all of a sudden or completely. Instead, signs of a loss of road grip can usually be detected during a pre-phase at individual tires only, without the vehicle driver or the assistance systems (e.g. ESC) known from prior art noticing it, since, at the beginning of a loss of road grip, a loss of driving stability does not yet occur. Thus, in the systems known from prior art, neither the rotational speed nor the lateral acceleration sensors of the ESC nor the proprioception of the vehicle driver (i.e. the vehicle driver's own subjective perception) will react.

Aquaplaning, in particular, does not occur all of a sudden, in the form of a sudden several millimeter thick, closed blanket of water, on which a tire will immediately and completely start to swim, but it starts at the beginning of the rainfall as well as when a vehicle enters a zone where rain has been falling for a longer period of time with a "spotted area". Likewise, road surfaces covered in snow or ice will not be all of a sudden completely slippery, but, in most cases, only within a relatively narrow range of temperatures. This transition as well does not occur all of a sudden for the vehicle, but, in most cases, there is a spotted area. Ultimately, the loss of the contact pressure in case of increasing speed does also not occur all of a sudden, but starts with the odd "dancing" of a tire due to an always existing unevenness of the road surface. In all three of the above described scenarios there is a transition phase where, if applicable, only a very short-term inadequate rotational behavior occurs initially at individual wheels. Either the individual (drive) wheels turn too fast (short-term "micro wheelspinning") or too slowly (short-term "micro blocking"), in particular in connection with braking or the drag torque. In other words, short, in particular ultra-short, fluctuations in the rotation(al speed), which are not or not sufficiently detected by systems known from prior art, occur, in particular at individual wheels.

This problem and others are solved or respectively reduced by the acceleration sensor according to the invention, which has a high and, at the same time, speed-independent sensitivity, even in the case of high vehicle speed. The direct acceleration sensor according to the invention has a high and almost stable speed-independent sensitivity even in the case of the decisive high speeds of the vehicle, as opposed to the previously known indirect system as, for example, described on page 22, lines 15 et seqq. of DE 32 06 694 A1: "The varying acceleration difference threshold values, which increase with the increase of the vehicle speed, are necessary, since higher speeds lead to higher acceleration difference interference values due to the unevenness of the road surface"). In addition, the acceleration sensor according to the invention makes it possible to detect each vehicle wheel individually without the requirement to detect a rotation of the vehicle wheel in relation to the other wheels.

In addition to being used for avoiding accidents, the acceleration sensor according to the invention can also be used for fine tuning in motor sports (it is, for example, possible to set precisely the desired slip value) and for complementing or replacing entirely the wheel speed sensors for ESC known from prior art.

Preferably, the tube is arranged at the vehicle wheel in such a way that a movement of the mass from the idle position will occur if the acceleration of the vehicle wheel, in particular in the rotational direction of the vehicle wheel, changes. Thus, through the inertia of the mass, the acceleration sensor according to the invention directly detects a change in the acceleration of the vehicle wheel which may mean a, in particular longitudinal, loss of road grip. Especially if the vehicle is not accelerated or slowed down, there should be no change in the acceleration of the vehicle wheel unless there is a loss of road grip. However, if such a change in the acceleration does occur, this may be an indication of a loss of road grip of the vehicle wheel, which can be directly detected by the acceleration sensor according to the invention, in particular without the need to evaluate or process one or several sensor signals beforehand.

The invention is based, amongst others, on the insight that existing sensors or systems for determining the wheel slip are inaccurate, error-prone and/or slow particularly because a. the change in the acceleration of an individual wheel is not detected and indicated directly and immediately, but indirectly via an evaluation of or derivation from other signals or via a calculation based on other signals. However, as an inertial sensor, the sensor according to the invention determines the change in the acceleration, which indicates the loss of road grip, of an individual wheel directly and immediately.

b. the decisive dangerous loss of road grip situations occur in the high speed range (80-200 km/h) when an ultra-short inadequate rotational behavior of individual wheels is simply missed due to an increased background noise, as, for example, in DE 32 06 694 A1. However, the direct torque sensor according to the invention mostly maintains its sensitivity even at high speeds; and c. in this speed range, upon a—in most case—complete loss of road grip occurs, even ESP unfortunately is not able to create any successful effect.

When installed, the acceleration sensor according to the invention is preferably arranged at or in a rotating part of the vehicle wheel, in particular at or in a tire, a rim or a brake disk. Furthermore preferably, the tube extends, when installed, essentially over a circular arc segment in the rotational direction of the vehicle wheel. The radius of the circular arc segment preferably corresponds to the radius of the vehicle wheel at the installation position, i.e. the distance between the tube from the center of the vehicle wheel, or is smaller if no other components are to be used for blocking. If the acceleration sensor is, for example, installed in the outer area of the tire, the radius of the circular arc segment will approximately correspond to the outside radius of the tire. The movement of the mass in the longitudinal direction preferably corresponds to a movement along the longitudinal axis of the circular arc segment and, thus, to a movement in or against the rotational direction of the vehicle wheel.

Furthermore preferably, the tube has an essentially hollow cylinder-shaped and closed design. Preferably, the tube is made of plastic, in particular of a hardened plastic, ceramic or non-ferromagnetic metal. Thus, the acceleration sensor is able to withstand mechanical stress. Moreover, the acceleration sensor may be entirely enclosed by plastic (e.g. be cast in plastic). Thus, the acceleration sensor becomes resistant for example against dirt, liquid and dust. The mass preferably has a ball-shaped design, which minimizes the wear and tear of the acceleration sensor. Thus, an acceleration sensor may be used throughout an entire maintenance cycle, and, preferably throughout the entire life cycle of a vehicle. An acceleration sensor installed in a tire of a vehicle will be replaced without any additional effort and cost when the tire is changed. Therefore, it is even sufficient when the life cycle of the acceleration sensor corresponds to the life cycle of a tire. Furthermore preferably, the mass consists of a ferromagnetic material and/or forms a permanent magnet.

It is particularly preferable that the acceleration sensor be arranged in the area of the wheel hub, the axle or close to the differential. In these areas of the vehicle wheel, the acceleration sensor is protected from thermal and mechanical stress, which may, for example occur in the tire or in the area of the brake disks.

Furthermore preferably, the diameter of the tube is essentially smaller than the radius of the longitudinal axis. A ratio diameter/radius in the range from 1/400 (for example with a tube diameter of 2 mm and a tire diameter of 800 mm in the case of a mobile work machine) to a maximum of 1/40 (with a tube diameter of 10 mm and a tire diameter of 400 mm in the case of a passenger car), in the case of passenger cars in particular in a range from 1/275 (e.g. with a tube diameter of 2 mm and a tire diameter of 550 mm) to 1/40 (with a tube diameter of 10 mm and a tire diameter of 400 mm), is preferable. Preferably, the tube has a length of a few centimeters. A length ratio diameter/length of the tube in the range from 1/20 (with a tube diameter of 2 mm and a tube length of 40 mm) to 1/6 (with a tube diameter of 5 mm and a tube length of 30 mm) is particularly preferable. If a ball-shaped mass is used, the ratio between the diameter of the mass and the diameter of the tube will preferably be in a range from 1/2 to 3/4. It is particularly preferable that the diameter of the mass be slightly smaller than the inside diameter of the tube, in particular with a ratio mass diameter/inside diameter in the range from 7/8 to 9/10, preferably also up to 95/100. Thus, the movements of the mass transverse to the longitudinal direction of the tube, such as dancing movements in reaction to a centrifugal force or resonances in reaction to forces periodically impacting the mass, are reduced.

In accordance with a first preferred embodiment of the acceleration sensor according to the invention, the magnet arrangement comprises an electric coil arrangement at least partially enclosing the tube, in particular a circular arc coil. Preferably, the magnet arrangement is formed by a coil arrangement consisting of a wire wound around the tube several times. For the coil arrangement to exert a magnetic force on the mass, the coil wire is provided with electric current. Preferably, the term circular arc coil means that the coil is wound around the tube, which extends in the shape of a circular arc, and therefore runs transversely to the circumferential direction of the wire in the shape of a circular arc. Preferably, the voltage is provided to the coil by means of induction or by means of a battery.

In accordance with another preferred embodiment of the acceleration sensor according to the invention, the magnet arrangement comprises a magnet section designed to exert an attracting force on the mass, wherein the idle position of the mass is in the rotational direction of the vehicle wheel, within the magnet section. The magnet section is preferably formed by a coil section. Preferably, the coil section encloses a center area of the longitudinal axis of the tube, wherein the center area separates the tube in two equal halves. A movement of the mass from the center area constitutes a movement of the mass from the idle position.

In accordance with another preferred embodiment of the acceleration sensor according to the invention, the magnet arrangement comprises two magnet sections designed to exert a repelling force on the mass, wherein the idle position of the mass is in the rotational direction of the vehicle wheel, between the magnet sections. Preferably, the magnet sections are formed by a coil section, respectively. Looking in the longitudinal direction of the tube, the two coil sections preferably enclose an end area of the tube, respectively, in such a way that, due to the repelling forces of the coil sections, the mass is kept in a center area of the tube in an idle position.

In accordance with another preferred embodiment of the acceleration sensor according to the invention, the read-out unit comprises a contact surface, which is respectively arranged at an end of the tube, wherein the read-out unit is designed to detect a contact between the mass and the contact surface. From a constructional point of view, this is a particularly simple design of the acceleration sensor through which the movement of the mass from the idle position can be qualitatively detected. Preferably, the acceleration sensor can be dimensioned in such a way that minimal fluctuations in the movement of the mass do not lead to a contact with the contact surface.

In accordance with another preferred embodiment of the acceleration sensor according to the invention, the read-out unit is designed to determine the position of the mass inside the tube. This has the advantage that a degree of road grip, for example the friction coefficient between the material of the vehicle tire and the road surface, can be determined based on the position of the mass when the mass moves from the idle position. Especially in motor sports, a quantitative determination of the degree of road grip can be used for optimization purposes.

Furthermore, the acceleration sensor is preferably designed to only detect such changes in the acceleration of the vehicle wheel which are not due to an intended acceleration of the vehicle (by the vehicle engine) or a braking process.

In accordance with a further development of the above described first preferred embodiment, the acceleration sensor according to the invention comprises a control unit designed to control the force exerted on the mass by means of the coil arrangement in dependence of the acceleration applied to the vehicle wheel by means of the vehicle brakes and the vehicle engine. During operation, a vehicle is constantly being accelerated and slowed down. These forces also affect the acceleration sensor and may impact the detection of a loss of road grip. In accordance with this embodiment, the force exerted on the mass by the coil arrangement is controlled by means of a control unit. The control unit takes into account the current acceleration effected by the vehicle engine and the current braking acceleration effected by the vehicle brakes. Furthermore preferably, additional effects such as the engine's brake effect, loss of friction, wind impact etc. can be taken into account for the control of the coil. The control of the force exerted on the mass by the coil is executed by way of controlling the current flowing through the coil wire.

This embodiment creates an acceleration sensor which, in a multitude of driving scenarios, provides more reliable results with regard to a loss of road grip of a vehicle wheel. Various acceleration effects affecting the vehicle wheel are eliminated or respectively reduced by a control of the coil arrangement in such a way that a movement of the mass from the idle position can be detected as a loss of road grip in a multitude of driving situations.

Moreover, the embodiment of the acceleration sensor with the control unit has the advantage that acceleration sensors with the same dimensions and made of the same material can be used for different vehicle types. This simplifies the manufacture of the acceleration sensors. Preferably, the acceleration sensor is adapted to the vehicle type by means of the control. Thus, the engine power and braking power of different vehicle types can be taken into account for the control, for example by calibrating the control at the vehicle manufacturers works or, in the case of sports cars, in the vehicle itself by means of a computer program.

Especially for use in the context of fine tuning, e.g. in motor sports, the use of the comparably expensive and complex embodiment with the control unit is particularly preferable.

In another preferred embodiment of the acceleration sensor according to the invention, the tube is filled with a fluid for damping the movement of the mass. Preferably, the fluid comprises air, water and/or oil. If need be, an intra-tubular bypass system may be provided as well.

In accordance with another preferred embodiment, the acceleration sensor comprises several masses. Preferably, the masses respectively consist of a ferromagnetic material and/or form a permanent magnet. Furthermore, the masses preferably have a ball-shaped design. Preferably, the ratio between the diameter of one of the ball-shaped masses and the diameter of the tube is in a range from 1/3 to 1/10. The read-out unit is preferably designed to detect the movement of one or several of the masses from the idle position. Further preferably, the read-out unit is designed to determine the position of one or several masses inside the tube. Moreover, the read-out unit is preferably designed to determine the local distribution of the masses inside the tube.

According to a second aspect of the invention, the above mentioned object of the invention is achieved by means of an acceleration sensor for detecting a loss of road grip of a vehicle wheel comprising a mass movably arranged along a circular arc segment, at least one spring element designed to counteract a movement of the mass from an idle position, and a read-out unit designed to detect a movement of the mass from the idle position, wherein the mass is preferably arranged at the vehicle wheel in such a way that a movement of the mass from the idle position will occur if the acceleration of the vehicle wheel, preferably in the rotational direction of the vehicle wheel, changes.

When installed, the acceleration sensor according to the invention is preferably arranged at or in a rotating part of the vehicle wheel, in particular at or in a tire, rim or brake disk. Furthermore preferably, the circular arc segment, along which the mass is movably arranged, extends essentially in the rotational direction of the vehicle wheel. The radius of the circular arch segment preferably corresponds to the radius of the vehicle wheel at the installation position, i.e. the distance between the mass from the center of the vehicle wheel, or is smaller if no other components are to be used for blocking.

Preferably, the mass is arranged at the vehicle wheel in such a way that a movement of the mass from the idle position will occur if the acceleration of the vehicle wheel, in particular in the rotational direction of the vehicle wheel, changes. Thus, through the inertia of the mass, the acceleration sensor according to the invention directly detects a change in the acceleration of the vehicle wheel which may mean a loss of road grip. Especially if the vehicle is not accelerated or slowed down, there should be no change in the acceleration of the vehicle wheel unless there is a loss of road grip. However, if such change in the acceleration does occur, this may be an indication of a loss of road grip of the vehicle wheel, which can be directly detected by the acceleration sensor according to the invention, in particular without the need to evaluate or process one or several sensor signals beforehand.

Furthermore preferably, the movable mass is arranged in a closed chamber, wherein two spring elements connect the mass with an inside wall of the chamber. Preferably, the chamber consists of closed and hardened plastic, ceramic or metal. Thus, the acceleration sensor becomes resistant for example against dirt, liquid and dust. Thus, an acceleration sensor may be used throughout an entire maintenance cycle, and, preferably throughout the entire life cycle of a vehicle. An acceleration sensor installed in a tire of a vehicle will be replaced when the tire is changed. Therefore, it is even sufficient when the life cycle of the acceleration sensor corresponds to the life cycle of a tire.

An advantage of the acceleration sensor in accordance with the second aspect of the invention is the, from a constructional point of view, particularly simple design and a cost-efficient manufacture. In cases where the mass only moves slightly from the idle position, the force exerted on the mass is in accordance with Hooke's law. Therefore, a quantitative calculation of the acceleration applied to the mass based on the movement of the mass from the idle position is particularly easy.

In accordance with a preferred embodiment of the acceleration sensor, the mass is attached in a pendulum-like manner at a center of the circular arc segment. When the acceleration sensor is installed, the mass is preferably arranged at or in a vehicle wheel and can be moved essentially in the rotational direction of the vehicle wheel. The pendulum-like suspension of the mass is preferably configured in such a way that the suspension point is inside the chamber in which the mass is arranged. In this case, the circular arc segment will have a radius which is significantly smaller than the radius of the vehicle wheel at the installation position. Furthermore, the mass is preferably designed essentially in the shape of an admiralty anchor, namely with a straight rod at the end of which a circular arc-shaped segment is arranged.

In accordance with another preferred embodiment of the acceleration sensor, the read-out unit comprises a contact surface and is designed to detect a contact between the mass and the contact surface. This means that, especially if an admiralty anchor-shaped mass is used, an acceleration sensor is created which, even in the case of minor movements, touches a contact surface, since the circular arc-shaped section creates two arms extending from the straight rod in the direction of the movement.

In another preferred embodiment of the acceleration sensor, the read-out unit is designed to determine a position of the mass in the rotational direction of the vehicle wheel. Thus, the acceleration applied to the mass and, therefore, the degree of road grip of the vehicle wheel can be quantitatively determined.

In accordance with a third aspect of the invention, the above mentioned object is achieved by means of an arrangement for detecting a loss of road grip of a vehicle wheel comprising a first acceleration sensor, in particular an acceleration sensor of the above described type, arranged at a vehicle wheel, and a warning unit designed to inform a vehicle driver of the loss of road grip if a loss of road grip is detected by means of the acceleration sensor.

Preferably, the warning unit can be a display visible to the vehicle driver. The display may be an analog round instrument, a digital or bar display at the dashboard of the vehicle cockpit or a head-up display. Preferably, the display is designed to show the degree of the road grip as a percentage (100% road grip to complete sliding with 0% road grip). Furthermore preferably, the warning unit comprises an acoustic warning unit and/or a steering wheel which vibrates for warning.

In accordance with a preferred embodiment of the arrangement according to the invention, a second (duplex) acceleration sensor is, in particular in accordance with the manner described above, arranged at the vehicle wheel, in particular, in relation to a center of the circular arc segment, opposite to the first acceleration sensor. This second acceleration sensor or respectively the embodiment with the second acceleration sensor may also be referred to as duplex acceleration sensor. In other words, the second (duplex) acceleration sensor is arranged in the rotational direction of the vehicle wheel, offset from the first acceleration sensor by 180°. When the movements of the mass of the first and the second acceleration sensor in the running direction are summed up, the linear accelerations of the wheel offset each other, and the rotational accelerations are added up. Thus, disturbing effects occurring independently from a loss of road grip of a vehicle wheel, such as imbalances, but also false positive movements of the mass due to a linear acceleration of the entire wheel (e.g. caused by potholes) can be taken out of the equation.

Another preferred embodiment of the arrangement according to the invention comprises a control unit designed to control the vehicle brakes and/or the vehicle engine in order to effect an acceleration, in particular a test acceleration, of at least one vehicle wheel. Preferably, the control unit has the purpose of effecting an acceleration of one or several of the vehicle wheels (by braking or engine acceleration) in order to cause a minor loss of road grip which serves to determine the degree of the loss of road grip. Thus, the control unit may preferably be configured a. to effect at regular time intervals the acceleration of one or several of the vehicle wheels, in particular automatically in critical driving situations (e.g. if a rain sensor is triggered or, in general, at temperatures below 3° Celsius).

b. A preferred further development of the above mentioned embodiment comprises an activation element designed to send, in particular in suspicious driving situations (e.g. rain and speed of 160 km/h, with the inventor not describing his own driving style and distancing himself from such speed), upon activation by the vehicle driver, a test acceleration signal to the control unit in order to effect an acceleration of at least one vehicle wheel. Preferably, the activation element is designed as a push button which is arranged on the dashboard of the vehicle cockpit and can be pushed by the vehicle driver if the vehicle driver wants to test the road grip of one or several vehicle wheels on the road surface. The activation element may be designed as a manual activation element and/or as a part of the control unit.

In accordance with a fourth aspect of the invention, the above mentioned object is achieved by means of a method for detecting a loss of road grip of a vehicle wheel comprising the steps of:

a) verifying a loss of road grip of a vehicle wheel if the loss of road grip is detected by means of an acceleration sensor arranged at the vehicle wheel, in particular an acceleration sensor of the above described type, wherein the verification is executed by way of
   i. an acceleration of the vehicle wheel by means of a vehicle brake and/or a vehicle engine,
   ii. the detection of a loss of road grip during the acceleration by means of the acceleration sensor,
b) informing a vehicle driver of the verified loss of road grip by means of a warning unit.

Through the invention, it was realized that a verification of the detected loss of road grip is desirable, especially at an early point in time upon the beginning of losses of road grip of low intensity not yet constituting a risk to stable driving behavior. The method according to the invention solves this problem by providing an active test in which one or several of the vehicle wheels are accelerated in order to detect whether or not a new loss of road grip occurs. Preferably, the acceleration is effected by an activation of the brakes, a sudden acceleration of the vehicle engine or by a KERS (Kinetic Energy Recovery System). The acceleration is preferably initiated by a control unit of the above described type, which is designed to control the vehicle brake and/or the vehicle engine in order to effect an acceleration of at least one vehicle wheel. Furthermore preferably, the acceleration occurs at at least two wheels diagonally opposite to each other, for example at the left front wheel and the right rear wheel. It is particularly preferable that the wheel accelerated in the test be compensated by the remaining 3 wheels. Preferably, the wheel diagonally opposite will see an acceleration preceded by the same mathematical sign and the two other wheels will see an acceleration preceded by the opposite sign. Thus, the risk of sliding during the testing of the loss of road grip is reduced and the acceleration of the passenger car in its entirety is reduced or prevented.

In accordance with a preferred realization of the method according to the invention, the acceleration of the vehicle wheel is performed by means of several subsequent accelerations of varying, in particular increasing, intensity. This creates a method by means of which a degree of road grip of the vehicle wheel can be determined. Preferably, accelerations of increasing intensity of the respective wheel will occur quickly one after the other, promptly after a loss of road grip has been detected. Based on the acceleration intensity at which the loss of road grip occurs, the degree of road grip is determined. To this end, the initial accelerations are of low intensity. Upon each additional acceleration, the intensity increases until a loss of road grip is detected. Subsequently, the accelerations will be further increased by small amounts in order to further verify the acceleration degree at which the loss of road grip occurs.

A preferred further development of the method according of the invention comprises the step of: Indicating a relative loss of road grip in dependence of the intensity of the acceleration at which the loss of road grip is verified. The indicating may preferably be performed by means of a display of the above described type.

In accordance with a fifth aspect of the invention, the above mentioned object is achieved by means of a method for detecting a loss of road grip of a vehicle wheel, comprising the steps of:

a) accelerating a vehicle wheel by means of a vehicle brake and/or a vehicle engine when an activation element is activated by the driver,
b) during the acceleration, detecting a loss of road grip of the vehicle wheel by means of an acceleration sensor, in particular an acceleration sensor of the above described type.

Preferably, the attention of the vehicle driver is drawn to the loss of road grip in an additional step of the method, for example by indicating the loss of road grip on a display.

In accordance with a preferred realization of the method according to the invention, the acceleration of the vehicle wheel is performed by means of several subsequent accelerations of varying, in particular increasing, intensity.

In accordance with a further development of the above mentioned realization, a degree of the road grip in dependence of the intensity of the acceleration at which the loss of road grip is detected is indicated.

Some preferred embodiments of the invention are, by way of example, described by means of the attached figures. The following is shown in

The illustrations of the schematically shown exemplary embodiments in FIGS. 1 to 6 are not true to scale. Especially the relation between the size of the acceleration sensor and the size of the vehicle wheel is not true to scale; when implemented in practice, the acceleration sensor would be significantly smaller than shown in the Figures.

DETAILED DESCRIPTION OF THE INVENTION

Figure 1:
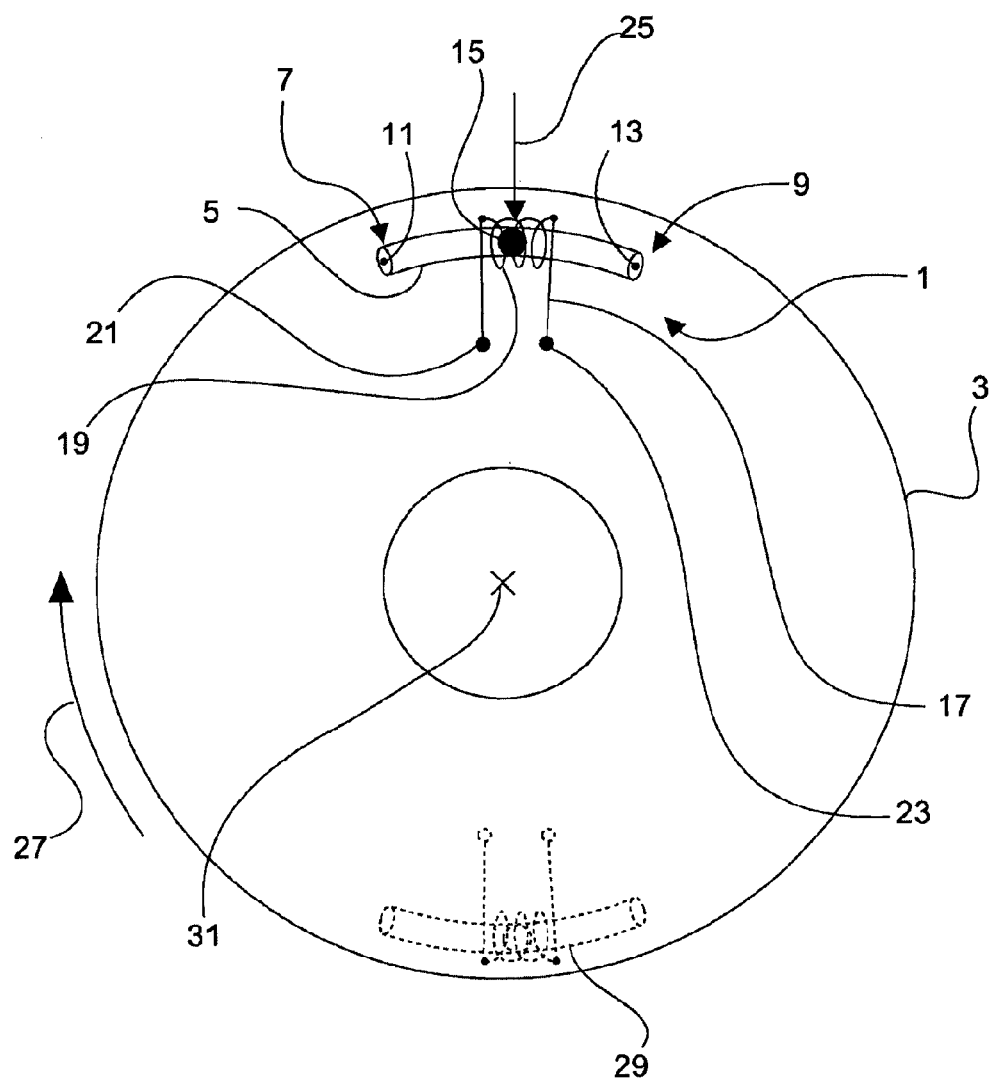
FIG. 1: a schematic illustration of a first exemplary embodiment of an acceleration sensor according to the invention.

FIG. 1 schematically shows an acceleration sensor 1 when installed at a vehicle wheel 3. The acceleration sensor 1 is a part of an arrangement 601 shown in FIG. 6 for detecting a loss of road grip of the vehicle wheel 3.

The acceleration sensor 1 comprises a tube 5 with a longitudinal axis which forms a circular arc segment. The tube 5 has closed ends 7 and 9. A contact surface 11 or respectively 13, which faces towards the inside of the tube 5, is respectively arranged at the ends 7 or respectively 9.

A ball 15 forming a mass consisting of steel is arranged inside the tube 5 such that it is able to move inside the said tube 5 in the longitudinal direction thereof. The tube 5 is filled with a fluid not shown in the illustration. A coil 17 encloses the tube by means of a coil wire 19 wound several times around the tube. The coil 17 is provided with power via two electrical contacts 21 and 23 in order to exert an attracting magnetic force on the ball 15 and to counteract a movement of the ball 15 in the rotational direction 27 of the vehicle wheel 3 from an idle position 25.

Figure 6:
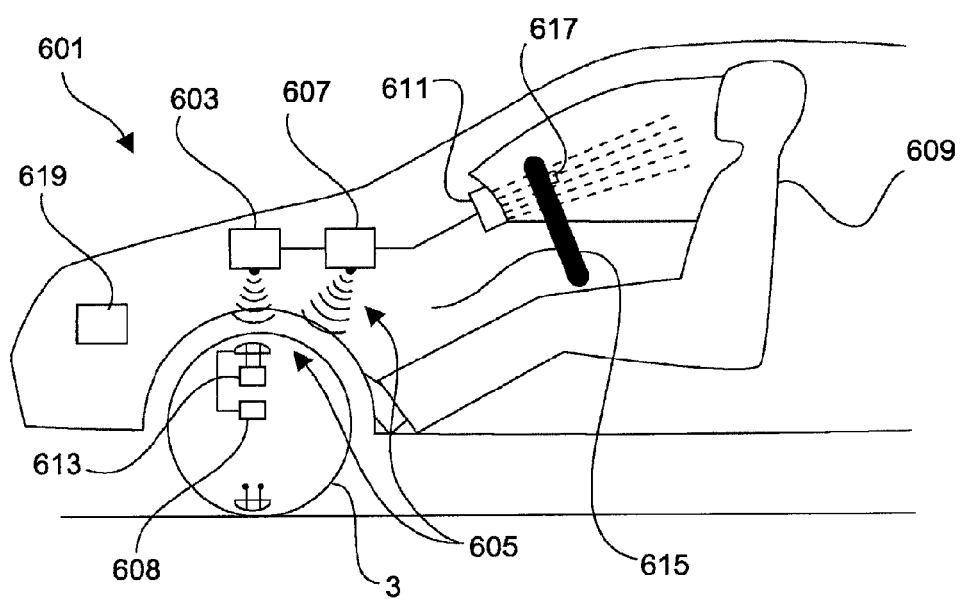
FIG. 6: a schematic illustration of an arrangement according to the invention.

A control unit 603 shown in FIG. 6 controls a power supply 613 of the coil 17. In this context, a positive acceleration of the vehicle wheel 3 in the rotational direction 27 through a vehicle engine is taken into account. This means that if the vehicle wheel 3 is accelerated in the rotational direction 27 through an increase of the torque of the vehicle engine, the control unit 603 will effect that the coil exerts an increased force on the ball 15 so that the latter remains in the idle position 25 (unless other accelerations effects occur). In addition, a negative acceleration of the vehicle wheel 3 against the rotational direction 27 through the vehicle brakes is taken into account. This means that if the vehicle wheel 3 is slowed down against the rotational direction 27 by the vehicle brake, the control unit 603 will effect that the coil exerts an increased force on the ball 15 so that the latter remains in the idle position. Through the compensation of positive accelerations (engine) and negative accelerations (brakes), a loss of road grip of the vehicle wheel 3 can be determined based on a movement of the ball 15 from the idle position 25. If, for example, the vehicle wheel 3 spins due to a loss of road grip, the ball 15 will, from the view direction of FIG. 1, move from the idle position 25 to the left. If the vehicle wheel 3 is locking up due to a loss of road grip when the vehicle is braking, the ball 15 will, from the view direction of FIG. 1, move to the right.

In addition to the acceleration sensor 1, a second duplex acceleration sensor 29, which, in terms of function, has an identical design to the first acceleration sensor 1, is arranged in the vehicle wheel 3. In relation to the center 31 of the circular arc segment, the second acceleration sensor 29 is arranged opposite to the acceleration sensor 1. In other words, the second acceleration sensor 29 is arranged in the rotational direction 27, offset from the first acceleration sensor 1 by 180°.

In addition, FIG. 6 shows an evaluation unit 605 with evaluation electronics 607 and a read-out unit 608. The read-out unit 608 comprises the contact surfaces 11 and 13 shown in FIG. 1. A communication between the evaluation electronics 607 and the read-out unit 608 is wireless. The read-out unit 608 detects when the ball 15 touches one of the contact surfaces 11 or 13. A contact between the ball 15 and one of the contact surfaces 11 or 13 represents a loss of road grip. This loss of road grip is optically indicated to a driver 609 by means of a display 611. The control unit 603 communicates wirelessly with the power supply 613 in order to control the force the coil 17 exerts on the ball 15.

An activation element 617 in the form of a push button is arranged at a vehicle steering wheel 615. If the vehicle driver 609 activates the activation element 617, an acceleration signal will be sent to a control unit 619. The control unit 619 is designed to control the vehicle engine and/or the vehicle brake in order to effect a positive or negative acceleration of the vehicle wheel 3.

The arrangement shown in FIG. 6 can be used to realize an exemplary realization of a method according to the invention for detecting a loss of road grip of a vehicle wheel in accordance with the fourth aspect of the invention. In a first method step A, it is tested at regular intervals by means of an acceleration sensor 1 arranged at the vehicle tire 3 whether or not there is a loss of road grip. As soon as a loss of road grip is detected, this loss of road grip is verified in a method step B. The verification of the loss of road grip comprises the following steps: In a first method step i., the vehicle wheel 3 is accelerated by means of the vehicle brake and/or the vehicle engine. The acceleration is effected by means of the control unit 619. In another method step ii., it is detected by means of the acceleration sensor 1, whether or not there is a loss of road grip during the acceleration. In a method step C, the vehicle driver 609 is informed of the verified loss of road grip by means of the display 611.

In addition, the arrangement shown in FIG. 6 can be used to realize a second exemplary realization of a method according to the invention for detecting a loss of road grip of a vehicle wheel 3 in accordance with the fifth aspect of the invention. In a first method step AA, the activation element 617 is activated by the vehicle driver 609. Once activated, the activation element 617 sends an acceleration signal to the control unit 619, which effects an acceleration of the vehicle wheel 3. Thus, in a method step BB, the vehicle wheel 3 is accelerated by means of the vehicle brake and/or the vehicle engine. During the acceleration, a loss of road grip of the vehicle wheel 3 is detected by means of the acceleration sensor 1 in a method step CC.

The acceleration in accordance with method step BB is executed by means of several subsequent accelerations with increasing intensity. First of all, the vehicle wheel is slightly accelerated. If no loss of road grip is detected during this minor acceleration, the vehicle wheel will be accelerated once again with an increased intensity. The intensity of the acceleration is increased with each new acceleration until a loss of road grip is detected. Based on the intensity of the acceleration at which a loss of road grip is detected, using empirical values, a degree of road grip can be determined. In a method step DD, the degree of road grip can be indicated to the vehicle driver 609 by means of the display 611.

Figure 2:
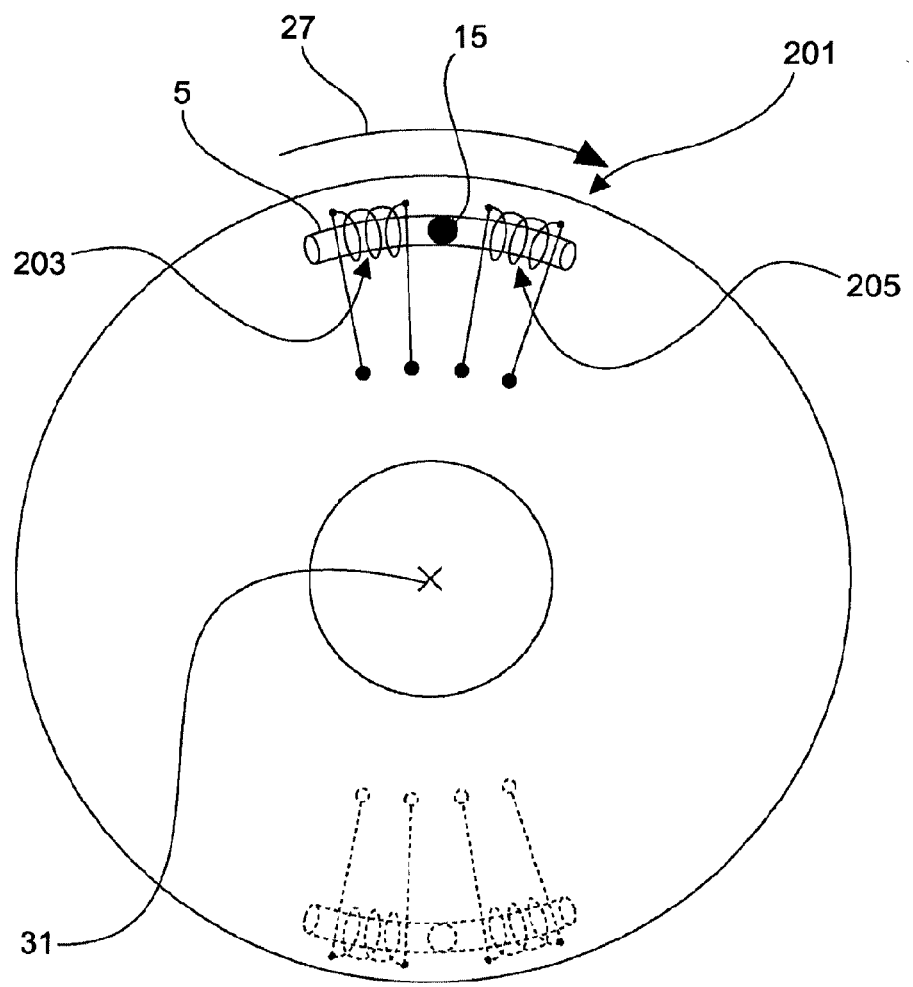
FIG. 2: a schematic illustration of a second exemplary embodiment of an acceleration sensor according to the invention.

FIG. 2 schematically shows an acceleration sensor 201 when installed at a vehicle wheel 3. The design of the acceleration sensor 201 is similar to the one of the acceleration sensor 1 shown in FIG. 1. Identical elements and elements with the same function are marked by the same reference number. Contrary to the acceleration sensor 1 shown in FIG. 1, the acceleration sensor 201 comprises two coils 203 and 205, which respectively exert a repelling magnetic force on the ball 15 in order to counteract a movement of the ball 15 from the idle position.

Figure 3:
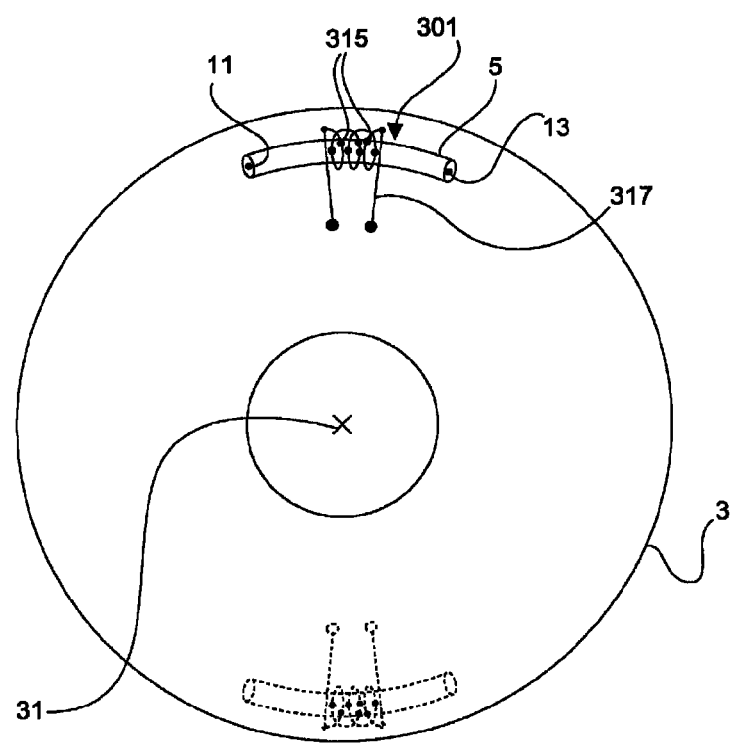
FIG. 3: a schematic illustration of a third exemplary embodiment of an acceleration sensor according to the invention.

FIG. 3 schematically shows an acceleration sensor 301 when installed at a vehicle wheel 3. The design of the acceleration sensor 301 is similar to the one of the acceleration sensor 1 shown in FIG. 1. Identical elements and elements with the same function are marked by the same reference number. Contrary to the acceleration sensor 1 shown in FIG. 1, the acceleration sensor 301 comprises several balls 315. The coil 317 exerts an attracting force on the balls 315 in order to counteract a movement of the balls 315 from the idle position.

Figure 4:
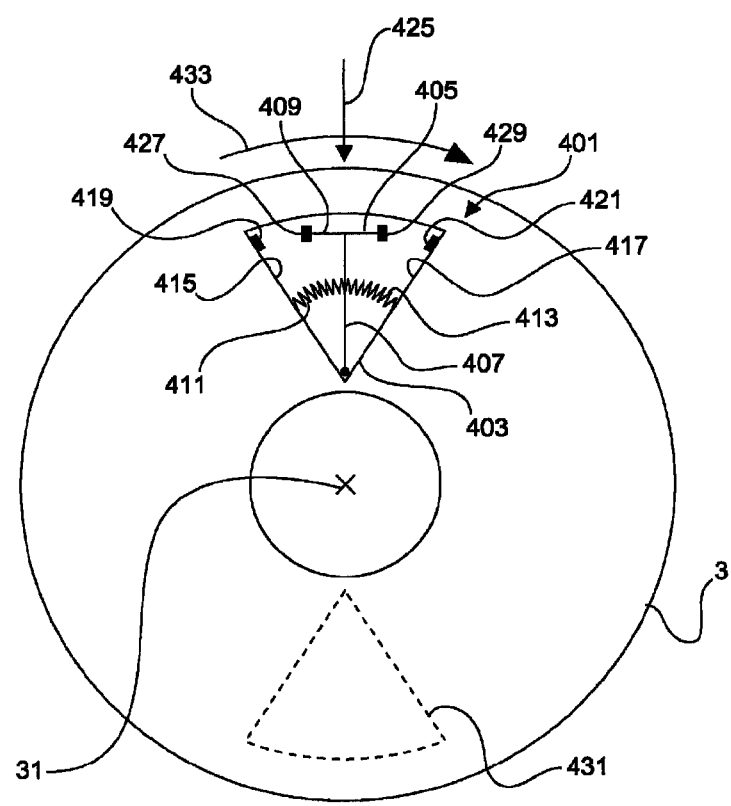
FIG. 4: a schematic illustration of a fourth exemplary embodiment of an acceleration sensor according to the invention.

FIG. 4 schematically shows an acceleration sensor 401 when installed at a vehicle wheel 3. The acceleration sensor 401 comprises a chamber 403 in which an admiralty anchor-shaped mass 405 is suspended by means of a straight rod 407 and a circular arc-shaped segment 409. The suspension is located at a first end of the rod 407, wherein, starting from a second end of the rod, the circular arc shaped segment 409 extends in two directions transversely to the longitudinal axis of the rod 407. A coil spring 411 or respectively 413 forms respectively a connection between the rod 407 and an inside wall 415 or respectively 417. The coil springs 411 and 413 counteract a movement of the mass 405 from an idle position 425. The chamber 403 respectively comprises a contact surface 419 or respectively 421, which an end 427 or respectively 429 of the segment 409 will touch if the mass 405 moves from the idle position 425. By means of a read-out unit, which is not shown in the figure, this contact of an end 427 or respectively 429 and a contact surface 419 or respectively 421 is detected. A second acceleration sensor 431, which, in terms of function, has the same design as the first acceleration sensor 401, is arranged in the rotational direction 433, offset from the first acceleration sensor 401 by 180°.

Figure 5:
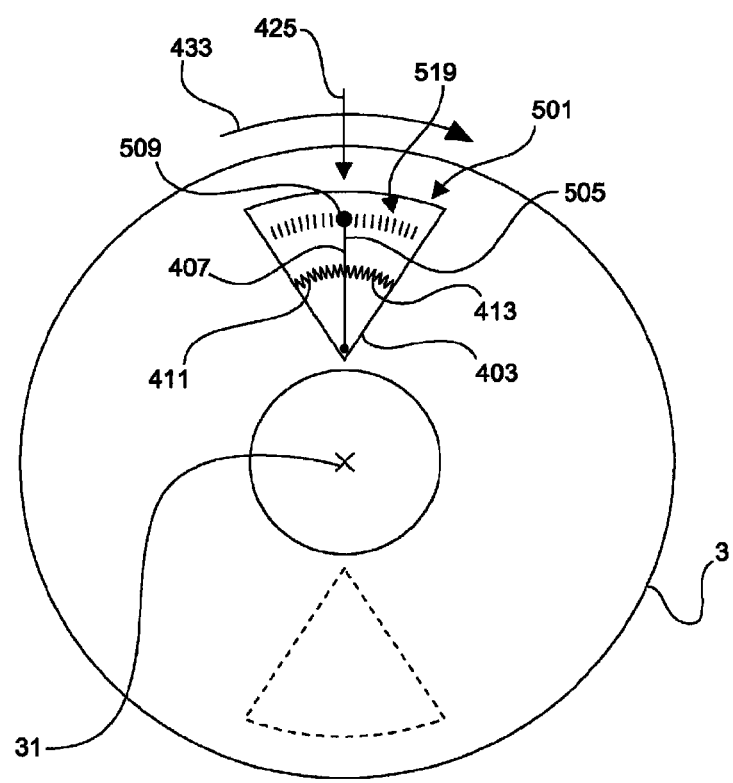
FIG. 5: a schematic illustration of a fifth exemplary embodiment of an acceleration sensor according to the invention.

FIG. 5 schematically shows an acceleration sensor 501 when installed at a vehicle wheel 3. The acceleration sensor 501 is designed similarly to the acceleration sensor 401. Identical elements and elements with the same function are marked by the same reference number. Contrary to the acceleration sensor 401 shown in FIG. 4, the mass 505, which is arranged in a pendulum-like manner inside the chamber 403, consists of a rod 407 and a ball-shaped head mass 509. The rod 407 is suspended at a first end in such a way that it can swing. The head mass 509 is arranged at a second end of the rod. In addition, the acceleration sensor 501 comprises several contact surfaces 519. Depending on how far the mass 505 swings out of the idle position 425, the ball shaped mass 509 will touch one of several contact surfaces 519. A read-out unit, which is not shown in the figure, detects which one of the contact surfaces 519 the ball 509 touches. Thus, the degree of the movement of the mass from the idle position 425 is determined.

REFERENCE NUMBERS

1 Acceleration sensor
3 Vehicle wheel
5 Tube
7, 9 End
11, 13 Contact surface
15 Ball
17 Coil
19 Coil wire
21, 23 Contacts
25 Idle position
27 Rotational direction
29 Second acceleration sensor (duplex acceleration sensor)
31 Center
201 Acceleration sensor
203, 205 Coils
301 Acceleration sensor
315 Balls
317 Coil
401 Acceleration sensor
403 Chamber
405 Mass
407 Rod
409 Segment
411, 413 Coil spring
415, 417 Inside wall
419, 421 Contact surface
425 Idle position
427, 429 End
431 Second acceleration sensor
433 Rotational direction
501 Acceleration sensor
505 Mass
509 Head mass
519 Contact surfaces
601 Arrangement
603 Control unit
605 Evaluation unit
607 Evaluation electronics
608 Read-out unit
609 Vehicle driver
611 Display
613 Power supply
615 Vehicle steering wheel
617 Activation element
619 Control unit

The invention claimed is:

1. An acceleration sensor for detecting a loss of road grip of a vehicle wheel (3), comprising:
    a tube (5) having a longitudinal axis forming a circular arc segment, and two closed ends (7, 9),
    a mass (15; 315) arranged inside the tube (5) such that it is able to move inside said tube (5) in a longitudinal direction thereof,
    a magnet arrangement (17; 203; 205; 317) designed to counteract, by way of a magnetic force exerted on the mass (15; 315), a movement of the mass (15; 315) from an idle position (25), and
    a read-out unit (608) designed to detect a movement of said mass (15; 315) from said idle position (25),
    wherein the tube (5) is capable of being arranged in the vehicle wheel in such a way that a movement of the mass from the idle position will occur if the acceleration of the vehicle wheel changes.

2. The acceleration sensor in accordance with claim 1, wherein the magnet arrangement (17; 203; 205; 317) comprises an electric coil arrangement at least partially enclosing the tube (5), in particular a circular arc coil.

3. The acceleration sensor in accordance with claim 2, comprising a control unit (603) designed to control the force exerted on the mass (15; 315) by means of the coil arrangement (17; 203; 205; 317) in dependence of the acceleration applied to the vehicle wheel (3) by means of the vehicle brakes and the vehicle engine.

4. The acceleration sensor in accordance with claim 1,
wherein the magnet arrangement comprises a magnet section (17; 317) designed to exert an attracting force on the mass (15; 315), and
wherein the idle position (25) of the mass (15; 315) is in the rotational direction (27) of the vehicle wheel (3) within the magnet section (17; 317).

5. The acceleration sensor in accordance with claim 1,
wherein the magnet arrangement comprises two magnet sections (203; 205) designed to exert a repelling force on the mass (15; 315), and
wherein the idle position (25) of the mass (15; 315) is in the rotational direction of the vehicle wheel (3) within the magnet sections (203; 205).

6. The acceleration sensor in accordance with claim 1,
wherein the read-out unit (608) comprises a contact surface (11; 13) respectively arranged at an end (7; 9) of the tube (5), and the read-out unit (608) is designed to detect a contact between the mass (15; 315) and the contact surface (11; 13).

7. An arrangement for detecting a loss of road grip of a vehicle wheel, comprising:
a first the acceleration sensor (1; 201; 301; 401; 501), in accordance with of claim 1, arranged at a vehicle wheel (3), and
a warning unit (611) designed to inform a vehicle driver (609) of the loss of road grip if a loss of road grip is detected by means of the acceleration sensor (1; 201; 301; 401; 501).

8. The arrangement in accordance with claim 7,
wherein a second duplex acceleration sensor (29; 431), is arranged at the vehicle wheel (3), in particular, in relation to a center (31) of the circular arc segment, opposite to the first acceleration sensor (1; 401).

9. The arrangement in accordance with claim 7, comprising
a control unit (619) designed to control the vehicle brake and/or the vehicle engine in order to effect an acceleration of at least one vehicle wheel (3).

10. The arrangement in accordance with claim 9, comprising:
an activation element (617) designed to send, upon activation by a vehicle driver (609), an acceleration signal to the control unit (619) in order to effect an acceleration of at least one vehicle wheel (3).

11. A method for detecting a loss of road grip of a vehicle wheel using the arrangement of claim 7, the method comprising the steps of:
a) verifying (B) a loss of road grip of the vehicle wheel (3) if the loss of road grip is detected (A) by means of the acceleration sensor (1; 201; 301; 401; 501) arranged at the vehicle wheel (3), in accordance with claim 7, wherein the verifying verification is executed by way of
i. an acceleration of the vehicle wheel (3) by means of a vehicle brake and/or a vehicle engine,
ii. the detection of a loss of road grip during the acceleration by means of the acceleration sensor (1), and
b) informing (C) a vehicle driver (609) of the verified loss of road grip by means of the warning unit (611).

12. A method for detecting a loss of road grip of a vehicle wheel using the arrangement of claim 7, the method comprising the steps of:
a) accelerating (BB) the vehicle wheel (3) by means of a vehicle brake and/or a vehicle engine when an activation element (617) is activated (AA) by the driver (609),
b) during the acceleration, detecting (CC) a loss of road grip of the vehicle wheel (3) by means of the acceleration sensor (1; 201; 301; 401; 501), in particular in accordance with claim 7.

13. The method in accordance with claim 12,
wherein the accelerating acceleration (BB) of the vehicle wheel (3) is performed by means of several subsequent accelerations of varying, in particular the varying including increasing, intensity.

* * * * *

UNITED STATES PATENT AND TRADEMARK OFFICE
CERTIFICATE OF CORRECTION

| | |
|---|---|
| PATENT NO. | : 9,989,554 B2 |
| APPLICATION NO. | : 14/916147 |
| DATED | : June 5, 2018 |
| INVENTOR(S) | : Bert Grundmann |

Page 1 of 1

It is certified that error appears in the above-identified patent and that said Letters Patent is hereby corrected as shown below:

In the Claims

In Column 14, Claim 1, Line 58 remove "capable of being"

In Column 14, Claim 2, Line 65 remove ", in particular a circular arc coil"

In Column 15, Claim 7, Line 28 remove "a first the acceleration sensor" and insert -- an acceleration sensor --

In Column 15, Claim 7, Line 28-30 remove "in accordance with of claim 1, arranged at a vehicle wheel (3), and" and insert -- of claim 1, and --

In Column 16, Claim 11, Line 16-17 remove "arranged at the vehicle wheel (3), in accordance with claim 7"

In Column 16, Claim 11, Line 18 remove "verification"

In Column 16, Claim 12, Line 34-35 remove ", in particular in accordance with claim 7"

In Column 16, Claim 12, Line 37-38 remove "acceleration (BB) of the vehicle wheel (3)"

In Column 16, Claim 12, Line 39 remove "in particular"

In Column 16, Claim 12, Line 40 remove "increasing, intensity" and insert -- increasing intensity --

Signed and Sealed this
Sixth Day of November, 2018

Andrei Iancu
*Director of the United States Patent and Trademark Office*